US012033491B2

(12) United States Patent
Adam et al.

(10) Patent No.: US 12,033,491 B2
(45) Date of Patent: Jul. 9, 2024

(54) SURVEILLANCE SYSTEM FOR AUTOMATIC SANITATION VERIFICATION

(71) Applicant: Johnson Controls Tyco IP Holdings LLP, Milwaukee, WI (US)

(72) Inventors: Lipphei Adam, Nolensville, TN (US); David S. Pinney, Westford, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/707,344

(22) Filed: Mar. 29, 2022

(65) Prior Publication Data

US 2022/0284795 A1   Sep. 8, 2022

Related U.S. Application Data

(63) Continuation of application No. 17/194,963, filed on Mar. 8, 2021, now Pat. No. 11,328,576.

(51) Int. Cl.
*G08B 21/24* (2006.01)
*G06V 20/52* (2022.01)
(Continued)

(52) U.S. Cl.
CPC ........... *G08B 21/245* (2013.01); *G06V 20/52* (2022.01); *G07C 1/10* (2013.01); *G07C 9/32* (2020.01); *G07C 9/38* (2020.01); *H04N 7/181* (2013.01)

(58) Field of Classification Search
CPC ........ G08B 21/245; G06V 20/52; G07C 1/10; G07C 9/32; G07C 9/38; H04N 7/181; G06Q 10/0639
See application file for complete search history.

(56) References Cited

U.S. PATENT DOCUMENTS

| 11,328,576 B1* | 5/2022 | Adam | G07C 9/32 |
| 2009/0086936 A1* | 4/2009 | Clifford | G06Q 10/06398 |
| | | | 379/88.13 |

(Continued)

FOREIGN PATENT DOCUMENTS

WO   WO-2019040976 A1 *   3/2019

OTHER PUBLICATIONS

International Search Report and Written Opinion in PCT/US2022/071027, dated May 30, 2022, 16 pages.

*Primary Examiner* — An T Nguyen
(74) *Attorney, Agent, or Firm* — ARENTFOX SCHIFF LLP

(57) ABSTRACT

Example aspects include a method, apparatus, and computer-readable medium for surveillance data processing for sanitation verification, comprising determining, by a processor based on area identification information received by a surveillance system of a premises, that an area of the premises requires periodic sanitation. The aspects further include determining, by the processor based on data captured by one or more sensors of the surveillance system, whether one or more persons associated with the cleaning staff profile have visited the area within a threshold period of time. Additionally, the aspects further include sending, by the processor, a first notification to a facilities management device in response to the one or more persons associated with the cleaning staff profile not having visited the area within the threshold period of time.

18 Claims, 6 Drawing Sheets

(51) Int. Cl.
*G07C 1/10* (2006.01)
*G07C 9/32* (2020.01)
*G07C 9/38* (2020.01)
*H04N 7/18* (2006.01)

(56) References Cited

U.S. PATENT DOCUMENTS

| | | | | |
|---|---|---|---|---|
| 2010/0134296 A1* | 6/2010 | Hwang | ................ | G08B 21/245 340/573.1 |
| 2012/0116803 A1* | 5/2012 | Reid | ...................... | G16H 40/20 705/2 |
| 2012/0173274 A1* | 7/2012 | Rensvold | ............ | G08B 21/245 705/2 |
| 2014/0244344 A1* | 8/2014 | Bilet | ...................... | G16Z 99/00 705/7.28 |
| 2014/0278638 A1 | 9/2014 | Kreuzkamp et al. | | |
| 2014/0327545 A1* | 11/2014 | Bolling | ................ | G08B 21/245 340/573.1 |
| 2016/0139067 A1* | 5/2016 | Grace | ................... | B08B 13/00 702/130 |
| 2016/0148485 A1* | 5/2016 | Hayes | ....................... | A61L 2/26 340/665 |
| 2018/0285061 A1* | 10/2018 | Park | ....................... | G06F 3/0488 |
| 2019/0012898 A1* | 1/2019 | Wittrup | ................ | G08B 21/245 |
| 2019/0059725 A1* | 2/2019 | Greiner | ................ | G16H 50/20 |
| 2019/0290796 A1* | 9/2019 | Ma | .......................... | G16H 40/20 |
| 2019/0354753 A1* | 11/2019 | Worrall | ................... | G06V 40/20 |
| 2020/0250956 A1* | 8/2020 | Hayes | ................... | G08B 21/245 |
| 2021/0027882 A1* | 1/2021 | Wellig | .................... | G01S 5/04 |
| 2021/0059784 A1* | 3/2021 | Nesterenko | .......... | G05B 19/406 |
| 2021/0193307 A1* | 6/2021 | Ma | .......................... | G06V 20/46 |
| 2021/0350689 A1* | 11/2021 | Kelly | ................... | G08B 21/245 |
| 2022/0309415 A1* | 9/2022 | Furusawa | .......... | G06Q 10/0637 |
| 2022/0358761 A1* | 11/2022 | Ferrante | ................... | A61L 2/28 |

* cited by examiner

300

302 Determining, by a processor based on area identification information received by a surveillance system of a premises, that an area of the premises requires periodic sanitation

304 Determining, by the processor based on data captured by one or more sensors of the surveillance system, whether one or more persons associated with a cleaning staff profile have visited the area within a threshold period of time

306 Sending, by the processor, a first notification to a facilities management device in response to the one or more persons associated with the cleaning staff profile not having visited the area within the threshold period of time

308 Determining, based on the data captured by an imaging sensor, whether a cleaning solution has been applied to the area

FIG. 3

SURVEILLANCE SYSTEM FOR AUTOMATIC SANITATION VERIFICATION

CROSS-REFERENCE TO RELATED APPLICATIONS

This application is a Continuation of U.S. Non-Provisional application Ser. No. 17/194,963, entitled "SURVEILLANCE SYSTEM FOR AUTOMATIC SANITATION VERIFICATION" and filed on Mar. 8, 2021, which is expressly incorporated by reference herein in the entirety.

FIELD

The present disclosure relates generally to surveillance systems and methods.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of surveillance data processing for sanitation verification, comprising determining, by a processor based on area identification information received by a surveillance system of a premises, that an area of the premises requires periodic sanitation. The method further includes determining, by the processor based on data captured by one or more sensors of the surveillance system, whether one or more persons associated with a cleaning staff profile have visited the area within a threshold period of time. Additionally, the method further includes sending, by the processor, a first notification to a facilities management device in response to the one or more persons associated with the cleaning staff profile not having visited the area within the threshold period of time.

Another example aspect includes an apparatus for surveillance data processing for sanitation verification, comprising a memory and a processor communicatively coupled with the memory. The processor is configured to determine, based on area identification information received by a surveillance system of a premises, that an area of the premises requires periodic sanitation. The processor is further configured to determine, based on data captured by one or more sensors of the surveillance system, whether one or more persons associated with a cleaning staff profile have visited the area within a threshold period of time. Additionally, the processor is further configured to send a first notification to a facilities management device in response to the one or more persons associated with the cleaning staff profile not having visited the area within the threshold period of time.

Another example aspect includes an apparatus for surveillance data processing for sanitation verification, comprising means for determining, based on area identification information received by a surveillance system of a premises, that an area of the premises requires periodic sanitation. The apparatus further includes means for determining, based on data captured by one or more sensors of the surveillance system, whether one or more persons associated with a cleaning staff profile have visited the area within a threshold period of time. Additionally, the apparatus further includes means for sending a first notification to a facilities management device in response to the one or more persons associated with the cleaning staff profile not having visited the area within the threshold period of time.

Another example aspect includes a non-transitory computer-readable medium storing instructions for surveillance data processing for sanitation verification, executable by a processor to determine, based on area identification information received by a surveillance system of a premises, that an area of the premises requires periodic sanitation. The instructions are further executable to determine, based on data captured by one or more sensors of the surveillance system, whether one or more persons associated with a cleaning staff profile have visited the area within a threshold period of time. Additionally, the instructions are further executable to send a first notification to a facilities management device in response to the one or more persons associated with the cleaning staff profile not having visited the area within the threshold period of time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 3 is a flow diagram of a first example method for automatic sanitation verification, according to some aspects;

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide methods and systems for automatic sanitation verification based on processing surveillance data. Some aspects include a surveillance system that processes data captured by one or more surveillance sensors (e.g., one or more cameras) to automatically determine whether cleaning staff have visited an area that requires sanitation (e.g., high-touch areas/surfaces in an office space). Some aspects further process the data captured by the surveillance sensors to automatically determine whether the cleaning staff have spent sufficient time at the areas that require sanitation. In one non-limiting aspect, for example, a video surveillance system may be configured to detect whether surface areas are being properly/sufficiently sanitized, in order to prevent the spread of contagious disease. Turning now to the figures, example aspects are depicted with reference to one or more components described herein, where components in dashed lines may be optional.

Figure 1:
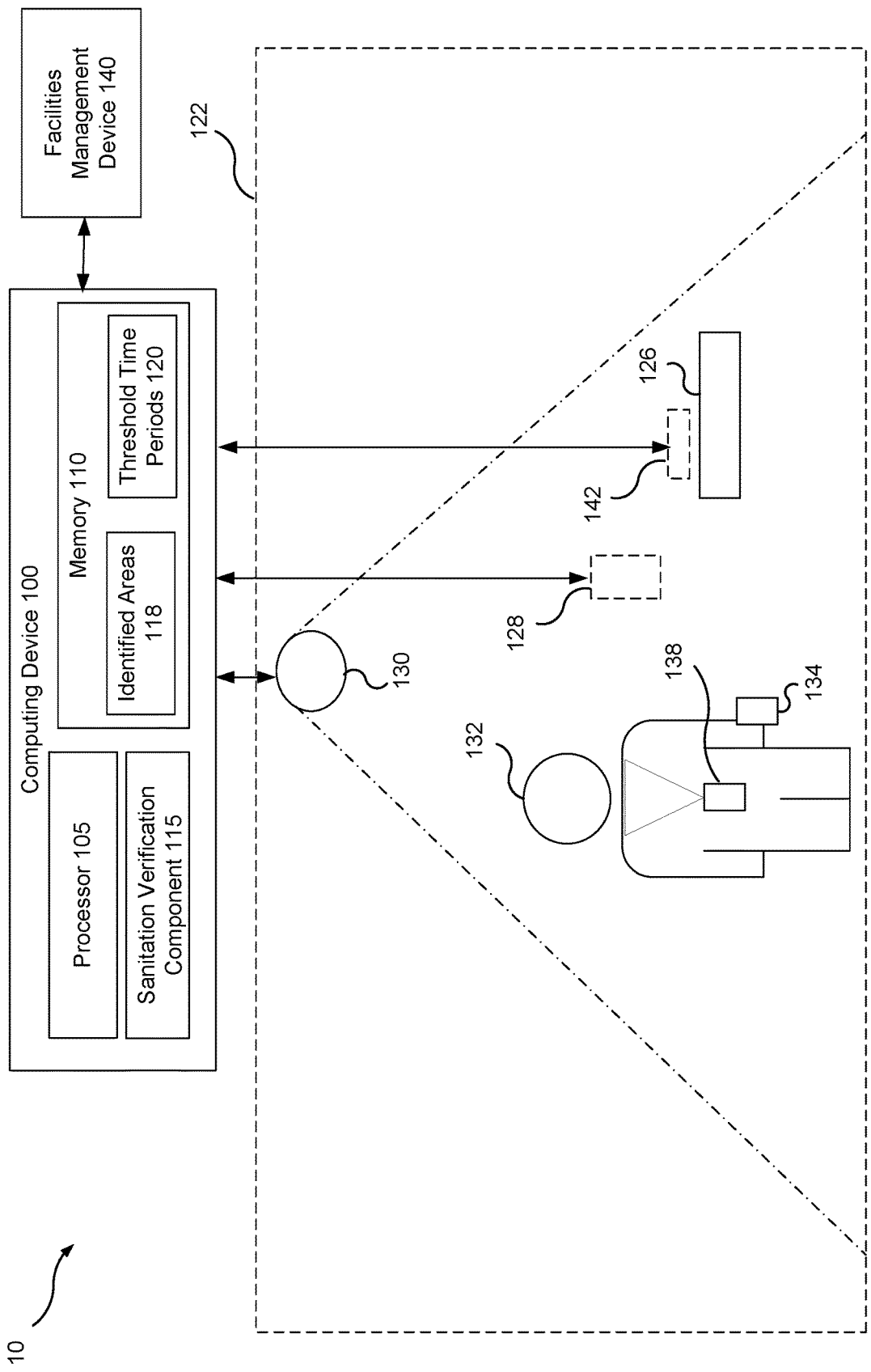
FIG. 1 is a schematic diagram of an example surveillance system configured for sanitation verification, according to some aspects.

Referring to FIG. 1, in one non-limiting aspect, a surveillance system 10 may include one or more image capture devices at various positions within a premises 122, such as a camera 130 positioned to monitor activities in real-time and/or forensically. In an aspect, for example, the surveillance system 10 may be configured to control the camera 130 to capture images/video of a "high-touch" area 126, e.g., an area that includes frequently touched surfaces such as a door handle at the front of the premises 122 or elsewhere within the premises 122, a conference room table, a light switch, a coffee/water station, etc. In an aspect, the surveillance system 10 includes video analytics for confirming whether any cleaning staff 132 have cleaned/sanitized the high-touch area 126.

In one non-limiting aspect, for example, a building owner or a maintenance team may determine which areas in the premises 122 are frequently touched, and then indicate those areas to the surveillance system 10 for automatic sanitation verification by the surveillance system 10. For example, in an aspect, the building owner or the maintenance team may include the high-touch area 126 in a list of identified areas 118, where the list of identified areas 118 indicates locations/coordinates of the areas within the premises 122 that include frequently touched surfaces. The building owner or the maintenance team may then provide the list of the identified areas 118 to the surveillance system 10. In an aspect, for each one of the identified areas 118, the building owner or the maintenance team may further indicate one or more corresponding threshold time periods 120 to the surveillance system 10, where the threshold time periods 120 indicate how often each one of the identified areas 118 needs to be cleaned/sanitized and/or how long the cleaning staff 132 need to spend sanitizing/cleaning each one of the identified areas 118.

In an aspect, the surveillance system 10 may store the identified areas 118 and/or the threshold time periods 120 locally, or may have access to a database that stores the identified areas 118 and/or the threshold time periods 120. In one non-limiting aspect, for example, referring now to both FIGS. 1 and 2, the surveillance system 10 may include a computing device 100 that includes a processor 105, a memory 110, and a sanitation verification component 115. The memory 110 may store the identified areas 118 and/or the threshold time periods 120, and the processor 105 may be communicatively coupled with the memory 110 and configured to execute one or more components within the sanitation verification component 115 to perform sanitation verification as described herein with reference to various aspects. Further details of various components within the sanitation verification component 115 are described below with reference to FIGS. 1-5.

In an aspect, the surveillance system 10 may identify when the high-touch area 126 is approached by the cleaning staff 132 based on images/videos captured by the camera 130. In an aspect, for example, the surveillance system 10 may identify when the high-touch area 126 is approached by the cleaning staff 132 based on a visual identification mechanism applied to the images/videos captured by the camera 130, such as facial recognition, identification of uniforms, etc.

In an optional aspect, in addition to determining whether the high-touch area 126 is approached by the cleaning staff 132, the surveillance system 10 may also determine, based on images/videos captured by the camera 130, the type/pattern of activity performed by the cleaning staff 132 at the high-touch area 126. For example, in an aspect, based on applying image/video analytics on the images/videos captured by the camera 130, the surveillance system 10 may determine whether the body movements/activities of the cleaning staff 132 at the high-touch area 126 corresponds to cleaning/sanitizing the high-touch area 126, e.g., wiping a surface at the high-touch area 126, spraying the high-touch area 126, etc.

In an aspect, for example, the surveillance system 10 may provide the images/videos captured by the camera 130 as input into an artificial intelligence (AI)/machine learning (ML) model (e.g., a deep neural network model). In an aspect, the AI/ML models may employ machine learning techniques and/or pattern recognition techniques to generate visual analytics based on images/videos captured by the camera 130. In an aspect, for example, the AI/ML model may be trained and configured to determine visual patterns of activity of a person within a three dimensional (3D) space at the premises 122, e.g., a conference room.

In an aspect, for example, the AI/ML models may be trained and configured to detect at least a portion of a body of a person in the images/videos captured by the camera 130. The AI/ML models may be further trained and configured to determine whether the detected person is within a threshold range of the high-touch area 126 in the images/videos captured by the camera 130.

In an alternative or additional aspect, the AI/ML models may be trained and configured to identify a person based on detecting a face of the person in the images/videos captured by the camera 130. For example, the surveillance system 10 may store, or may otherwise have access to, one or more cleaning staff profiles that include biometric information (e.g., facial landmarks) of the cleaning staff 132. The surveillance system 10 may then identify the cleaning staff 132 by matching the biometric information stored in the cleaning staff profiles with candidate biometric information detected by the AI/ML models in the images/videos captured by the camera 130.

In an alternative or additional aspect, the AI/ML models may be further trained and configured to generate a bounding box around a person detected in the images/videos captured by the camera 130, based at least in part on a detected face in the images/videos captured by the camera 130. In these aspects, the AI/ML models may be trained and configured to track the movement of the cleaning staff 132 by tracking the movement of the bounding box between successive image/video frames captured by the camera 130.

In one non-limiting aspect, for example, the surveillance system 10 may use the AI/ML models to detect a pattern corresponding to a shape of a body part, e.g., a hand, at the high-touch area 126, and then determine whether a movement of the body part corresponds to cleaning/sanitizing the high-touch area 126.

In an alternative or additional aspect, an article worn by the cleaning staff 132, e.g., a hat, scarf, vest, bracelet, glove, etc., may include a certain color/pattern/marking/shape that is detectable by the AI/ML models via imaging. In this aspect, the surveillance system 10 may use the AI/ML models to determine a pattern of activity of the cleaning staff 132 by detecting the color/pattern/marking/shape of the article in images/videos captured by the camera 130. For example, the surveillance system 10 may use the AI/ML models to detect the color/pattern/marking/shape of the article at the high-touch area 126, and then determine whether a movement of the article corresponds to cleaning/sanitizing the high-touch area 126.

In yet another alternative or additional aspect, the surveillance system 10 may also use the AI/ML models to determine, based on images/videos captured by the camera 130, whether a cleaning solution has been applied to a surface at the high-touch area 126. For example, in an aspect, a cleaning solution used for cleaning/sanitizing the high-touch area 126 may include a marker material detectable via imaging, such as particles of a certain radiation frequency or wavelength. In this aspect, the surveillance system 10 may use the AI/ML models to determine whether the marker material is detectable on a surface at the high-touch area 126 in images/videos captured by the camera 130.

In yet another alternative or additional aspect, the surveillance system 10 may also use the AI/ML models to determine, based on images/videos captured by the camera 130, whether a cleaning apparatus has been applied by the cleaning staff 132 to a surface at the high-touch area 126. For example, in an aspect, a cleaning rag/towel/cloth used for cleaning/sanitizing the high-touch area 126 may include a certain color/pattern/marking/shape that is detectable via imaging. In this aspect, the surveillance system 10 may use the AI/ML models to determine whether the certain color/pattern/marking/shape of the cleaning rag/towel/cloth is detectable in images/videos captured by the camera 130 as being applied to a surface at the high-touch area 126 by the cleaning staff 132.

In an alternative or additional aspect, for example, the surveillance system 10 may include an access panel 128 positioned at the high-touch area 126 (e.g., a card reader installed on a wall next to the high-touch area 126). In this aspect, the surveillance system 10 may identify when the high-touch area 126 is approached by the cleaning staff 132 based on the readings of the access panel 128 instead of or in addition to the images/videos captured by the camera 130. In one non-limiting aspect, the access panel 128 may be configured to read a radio-frequency identification (RFID) badge 138 or a key fob 134 associated with the cleaning staff 132, a password associated with the cleaning staff 132 and entered via the access panel 128, biometric information associated with the cleaning staff 132 and scanned by the access panel 128, etc.

In an aspect, the surveillance system 10 may further determine how much time the cleaning staff 132 have spent at the location of the high-touch area 126. In an aspect, for example, the surveillance system 10 may retrieve (e.g., from the memory 110 or from a remote database) a threshold time period 120 that indicates the amount of time that is adequate/sufficient for cleaning the high-touch area 126. If the threshold time period 120 is not satisfied (e.g., if the cleaning staff 132 have not spent sufficient time at the location of the high-touch area 126), the surveillance system 10 may send a corresponding notification to a facilities management device 140 associated with a facilities management entity.

In an aspect, the surveillance system 10 may further determine how often the cleaning staff 132 have cleaned the high-touch area 126. In an aspect, for example, if the cleaning staff 132 have not visited the high-touch area 126 within a corresponding threshold time period 120, the surveillance system 10 may send a corresponding notification to the facilities management device 140 associated with the facilities management entity.

In one non-limiting aspect, for example, the cleaning staff 132 may each carry a badge 138 or a key fob 134, and the cleaning staff 132 may swipe the badge 138 or the key fob 134 at the access panel 128 when they arrive at the location of the high-touch area 126 and also when they leave the location of the high-touch area 126. Accordingly, based on the readings of the access panel 128, the surveillance system 10 may automatically monitor the movement of the cleaning staff 132. If the cleaning staff 132 do not visit the high-touch area 126 within a threshold time period 120 that indicates how often the high-touch area 126 needs to be visited, the surveillance system 10 may send a corresponding notification to the facilities management device 140 associated with the facilities management entity.

In an aspect, the surveillance system 10 may also determine whether the cleaning staff 132 have spent enough time at the high-touch area 126. For example, the surveillance system 10 may determine the time elapsed between successive readings of the access panel 128 associated with the cleaning staff 132 arriving at the high-touch area 126 and then departing the high-touch area 126. The surveillance system 10 may then determine whether the time elapsed between arriving at the high-touch area 126 and departing the high-touch area 126 is greater than a threshold time period 120 that indicates how long the high-touch area 126 needs to be cleaned/sanitized. If the cleaning staff 132 did not spend sufficient time at the high-touch area 126, the surveillance system 10 may send a corresponding notification to the facilities management device 140 associated with the facilities management entity, indicating that the high-touch area 126 was not cleaned/sanitized properly.

In yet another alternative or additional aspect, for example, the surveillance system 10 may include one or more proximity sensors 142 positioned at or around the high-touch area 126 (e.g., an RFID sensor installed on or under a surface at the high-touch area 126). In this aspect, the surveillance system 10 may identify when the high-touch area 126 is approached by the cleaning staff 132 based on the readings of the proximity sensor 142 instead of or in addition to the readings of the access panel 128 and/or the images/videos captured by the camera 130. In one non-limiting aspect, for example, the proximity sensors 142 may be configured to read the RFID badge 138 or the key fob 134 associated with the cleaning staff 132 when the cleaning staff 132 are in a close proximity of the high touch area 126. In one non-limiting aspect, for example, the high-touch area 126 may include a surface of a conference room table, and the proximity sensors 142 may be installed at each corner of the conference room table to determine whether the cleaning staff 132 have cleaned the entire surface area of the conference room table.

In an aspect, the surveillance system 10 may further determine how often the cleaning staff 132 have cleaned the high-touch area 126, based on the readings of the proximity sensor 142 instead of or in addition to the readings of the access panel 128 and/or the images/videos captured by the camera 130.

In an aspect, the surveillance system 10 may further determine how much time the cleaning staff 132 have spent at the location of the high-touch area 126, based on the readings of the proximity sensor 142 instead of or in addition to the readings of the access panel 128 and/or the images/videos captured by the camera 130. In one non-limiting aspect, for example, the high-touch area 126 may include a surface of a conference room table, and the proximity sensors 142 may be installed at each corner of the conference room table to determine how much time the cleaning staff 132 have spent cleaning the surface area of the conference room table. In an aspect, for example, the surveillance system 10 may further determine how much time the cleaning staff 132 have spent cleaning a certain corner of the conference room table based on the time duration of the RFID badge 138 or the key fob 134 associated with the cleaning staff 132 being continually read at that corner of the conference room table. Alternatively or additionally, the surveillance system 10 may further determine how much time the cleaning staff 132 have spent cleaning the entire surface area of conference room table based on the time elapsed between the RFID badge 138 or the key fob 134 associated with the cleaning staff 132 being successively read from different corners of the conference room table.

Accordingly, the present aspects allow for checking and ensuring that high-touch surfaces/areas are being sanitized properly to prevent the spread of contagious disease.

Figure 2:
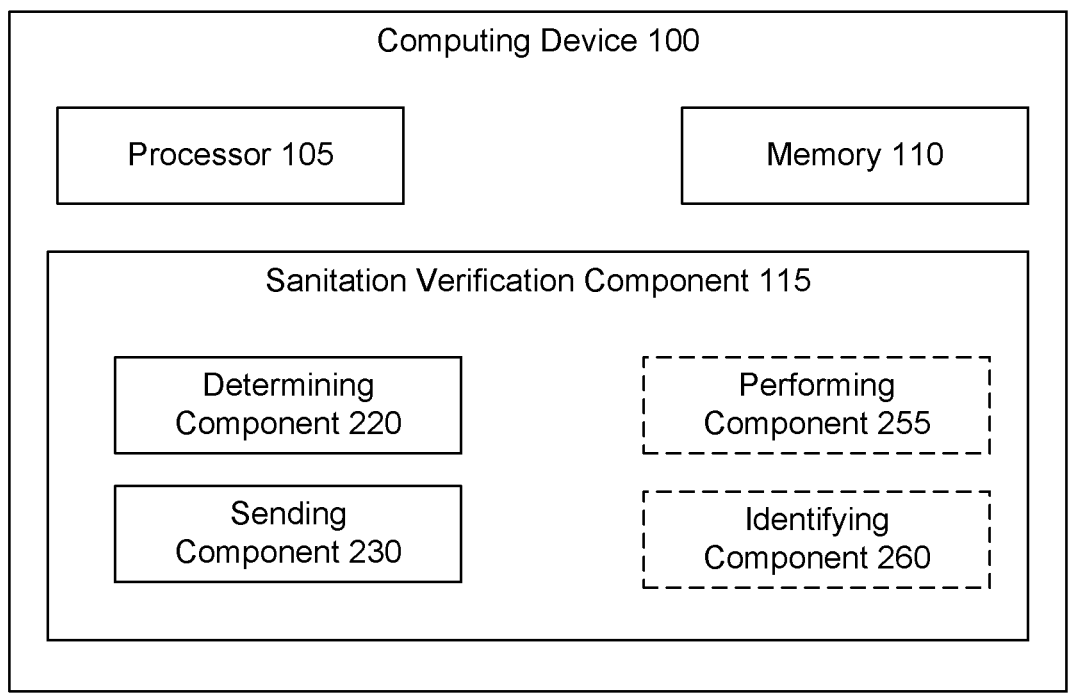
FIG. 2 is a block diagram of example components of the computing device in FIG. 1, according to some aspects.

Referring to FIG. 2 and FIG. 3, in operation, computing device 100 may perform a method 300 of surveillance data processing for sanitation verification, by such as via execution of sanitation verification component 115 by processor 105 and/or memory 110.

At block 302, the method 300 includes determining, by a processor based on area identification information received by a surveillance system of a premises, that an area of the premises requires periodic sanitation. For example, in an aspect, computing device 100, processor 105, memory 110, sanitation verification component 115, and/or determining component 220 may be configured to or may comprise means for determining, by a processor based on area identification information received by a surveillance system of a premises, that an area of the premises requires periodic sanitation.

For example, the determining at block 302 may include receiving a list of identified areas 118 from a building owner or a maintenance team. In an aspect, for example, a building owner or a maintenance team determines which areas in the premises 122 are frequently touched, and then indicate those areas to the surveillance system 10 for automatic sanitation verification by the surveillance system 10. For example, in an aspect, the building owner or the maintenance team may include the high-touch area 126 in a list of identified areas 118, where the list of identified areas 118 indicates locations/coordinates of the areas within the premises 122 that include frequently touched surfaces. The building owner or the maintenance team may then provide the list of the identified areas 118 to the surveillance system 10.

At block 304, the method 300 includes determining, by the processor based on data captured by one or more sensors of the surveillance system, whether one or more persons associated with a cleaning staff profile have visited the area within a threshold period of time. For example, in an aspect, computing device 100, processor 105, memory 110, sanitation verification component 115, and/or determining component 220 may be configured to or may comprise means for determining, by the processor based on data captured by one or more sensors of the surveillance system, whether one or more persons associated with the cleaning staff profile have visited the area within a threshold period of time.

For example, the determining at block 304 may include the surveillance system 10 identifying when the high-touch area 126 is approached by the cleaning staff 132 based on images/videos captured by the camera 130. In an aspect, for example, the surveillance system 10 may identify when the high-touch area 126 is approached by the cleaning staff 132 based on a visual identification mechanism applied to the images/videos captured by the camera 130, such as facial recognition, identification of uniforms, etc.

In an example of this aspect, for instance, wherein the one or more sensors comprise an imaging sensor, the determining whether the one or more persons associated with the cleaning staff profile have visited the area within the threshold period of time comprises performing image or video analytics on the data captured by the imaging sensor. For example, in an aspect, AI/ML models may be trained and configured to detect at least a portion of a body of a person in the images/videos captured by the camera 130. The AI/ML models may be further trained and configured to determine whether the detected person is within a threshold range of the high-touch area 126 in the images/videos captured by the camera 130. In an alternative or additional aspect, the AI/ML models may be trained and configured to identify a person based on detecting a face of the person in the images/videos captured by the camera 130.

In another example of this aspect, for instance, wherein the one or more sensors comprise a tag reader in an access control system, the determining whether the one or more persons associated with the cleaning staff profile have visited the area within the threshold period of time comprises determining whether the tag reader has read a tag associated with the one or more cleaning staff. In an aspect, for example, the surveillance system 10 may include an access panel 128 positioned at the high-touch area 126 (e.g., a card reader installed on a wall next to the high-touch area 126). In this aspect, the surveillance system 10 may identify when the high-touch area 126 is approached by the cleaning staff 132 based on the readings of the access panel 128 instead of or in addition to the images/videos captured by the camera 130. In an alternative or additional aspect, for example, the surveillance system 10 may include one or more proximity sensors 142 positioned at or around the high-touch area 126 (e.g., an RFID sensor installed on or under a surface at the high-touch area 126). In this aspect, the surveillance system 10 may identify when the high-touch area 126 is approached by the cleaning staff 132 based on the readings of the proximity sensor 142 instead of or in addition to the readings of the access panel 128 and/or the images/videos captured by the camera 130.

At block 306, the method 300 includes sending, by the processor, a first notification to a facilities management device in response to the one or more persons associated with the cleaning staff profile not having visited the area within the threshold period of time. For example, in an aspect, computing device 100, processor 105, memory 110, sanitation verification component 115, and/or sending component 230 may be configured to or may comprise means for sending, by the processor, a first notification to a facilities management device in response to the one or more persons associated with the cleaning staff profile not having visited the area within the threshold period of time.

For example, the sending at block 306 may include the surveillance system 10 determining how often the cleaning staff 132 have cleaned the high-touch area 126. In an aspect, for example, if the cleaning staff 132 have not visited the high-touch area 126 within a corresponding threshold time period 120, the surveillance system 10 may send a corresponding notification to the facilities management device 140 associated with the facilities management entity.

In an optional or additional aspect the one or more sensors comprise an imaging sensor. In this aspect, at block 308, the method 300 may further include determining, based on the data captured by the imaging sensor, whether a cleaning solution has been applied to the area. For example, in an aspect, computing device 100, processor 105, memory 110, sanitation verification component 115, and/or determining component 220 may be configured to or may comprise means for determining, based on the data captured by the imaging sensor, whether a cleaning solution has been applied to the area.

For example, the determining, at block 308 may include the surveillance system 10 using AI/ML models to determine, based on images/videos captured by the camera 130, whether a cleaning solution has been applied to a surface at the high-touch area 126.

In an example of this aspect, for instance, wherein the cleaning solution comprises a marker material, the determining whether the cleaning solution has been applied to the area comprises determining whether the data captured by the imaging sensor detects the marker material at the area. For example, in an aspect, a cleaning solution used for cleaning/sanitizing the high-touch area 126 may include a marker material detectable via imaging, such as particles of a certain radiation frequency or wavelength. In this aspect, the surveillance system 10 may use the AI/ML models to determine whether the marker material is detectable on a surface at the high-touch area 126 in images/videos captured by the camera 130.

Figure 4:
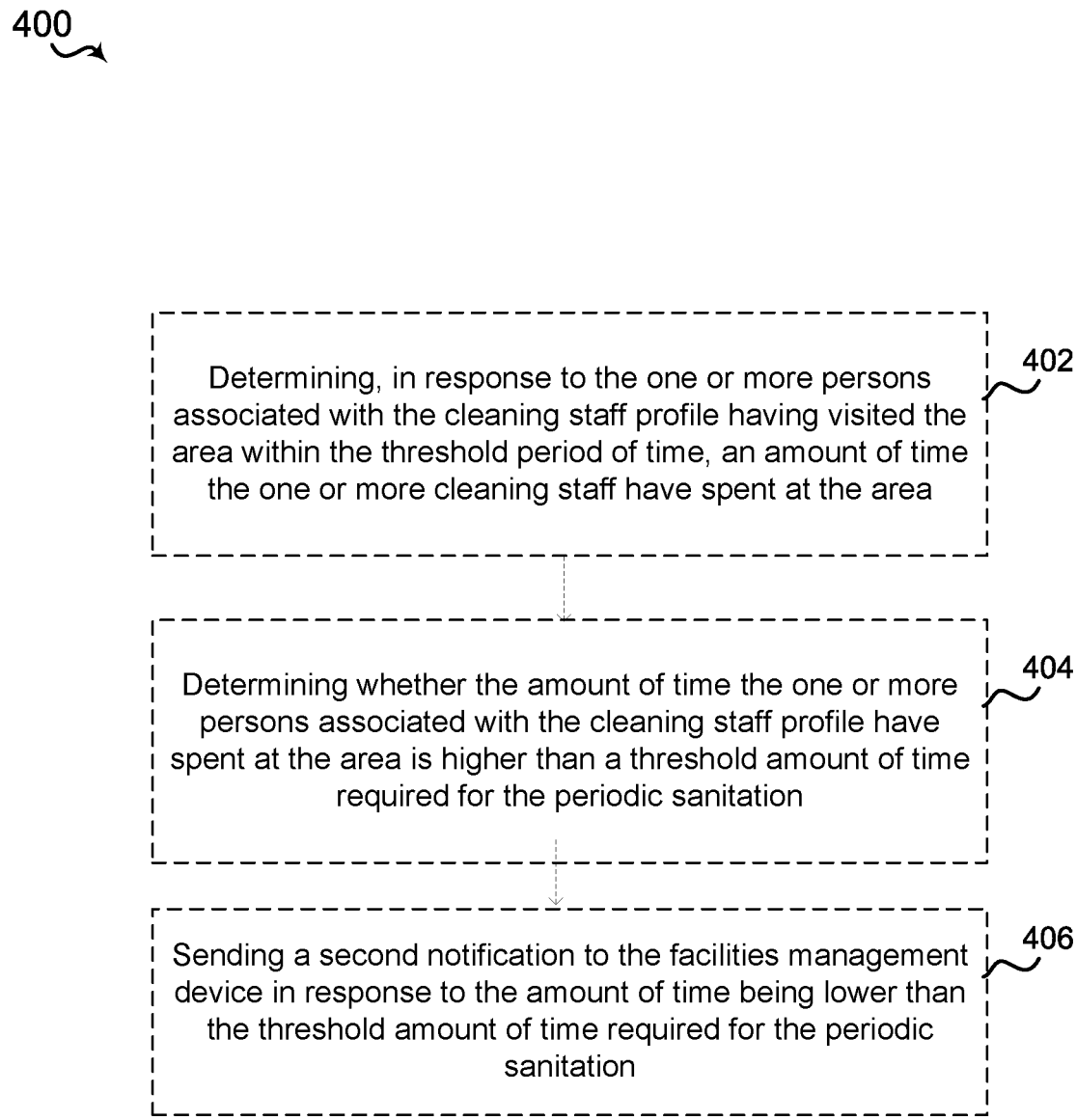
FIG. 4 is a flow diagram of a second example method for automatic sanitation verification, according to some aspects.

Referring to FIG. 4, in an optional or additional aspect, at block 402, the method 400 may further include determining, by the processor, in response to the one or more persons associated with the cleaning staff profile having visited the area within the threshold period of time, an amount of time the one or more persons associated with the cleaning staff profile have spent at the area. For example, in an aspect, computing device 100, processor 105, memory 110, sanitation verification component 115, and/or determining component 220 may be configured to or may comprise means for determining, in response to the one or more persons associated with the cleaning staff profile having visited the area within the threshold period of time, an amount of time the one or more persons associated with the cleaning staff profile have spent at the area.

For example, the determining at block 402 may include the surveillance system 10 determining, based on applying AI/ML models to images/videos captured by the camera 130, how much time the cleaning staff 132 have spent at the location of the high-touch area 126.

In this optional aspect, at block 404, the method 400 may further include determining whether the amount of time the one or more persons associated with the cleaning staff profile have spent at the area is higher than a threshold amount of time required for the periodic sanitation. For example, in an aspect, computing device 100, processor 105, memory 110, sanitation verification component 115, and/or determining component 220 may be configured to or may comprise means for determining whether the amount of time the one or more persons associated with the cleaning staff profile have spent at the area is higher than a threshold amount of time required for the periodic sanitation.

For example, the determining at block 404 may include the surveillance system 10 retrieving (e.g., from the memory 110 or from a remote database) a threshold time period 120 that indicates the amount of time that is adequate/sufficient for cleaning the high-touch area 126, and determining whether the amount of time the cleaning staff 132 have spent at the high-touch area 126 is higher than the threshold time period 120 for periodic sanitation of the high-touch area 126.

In this optional aspect, at block 406, the method 400 may further include sending a second notification to the facilities management device in response to the amount of time being lower than the threshold amount of time required for the periodic sanitation. For example, in an aspect, computing device 100, processor 105, memory 110, sanitation verification component 115, and/or sending component 230 may be configured to or may comprise means for sending a second notification to the facilities management device in response to the amount of time being lower than the threshold amount of time required for the periodic sanitation.

For example, the sending at block 406 may include the surveillance system 10 sending a notification to a facilities management device 140 associated with a facilities management entity, if the threshold time period 120 is not satisfied (e.g., if the cleaning staff 132 have not spent sufficient time at the location of the high-touch area 126).

In an example of this aspect, for instance, wherein the one or more sensors comprise an imaging sensor, the determining the amount of time the one or more persons associated with the cleaning staff profile have spent at the area comprises performing image or video analytics on the data captured by the imaging sensor at the area. For example, in an aspect, AI/ML models may be trained and configured to detect at least a portion of a body of a person in the images/videos captured by the camera 130. The AI/ML models may be further trained and configured to determine how long the detected person is within a threshold range of the high-touch area 126 in the images/videos captured by the camera 130.

In another example of this aspect, for instance, wherein the one or more sensors comprise a tag reader in an access control system, the determining the amount of time the one or more persons associated with the cleaning staff profile have spent at the area comprises determining whether the tag reader has read a tag associated with the one or more persons associated with the cleaning staff profile. For example, in an aspect, the surveillance system 10 may determine the time elapsed between successive readings of the access panel 128 associated with the cleaning staff 132 arriving at the high-touch area 126 and then departing the high-touch area 126. In an alternative or additional aspect, for example, the surveillance system 10 may determine how much time the cleaning staff 132 have spent at the location of the high-touch area 126, based on the readings of the proximity sensor 142 instead of or in addition to the readings of the access panel 128 and/or the images/videos captured by the camera 130.

Figure 5:
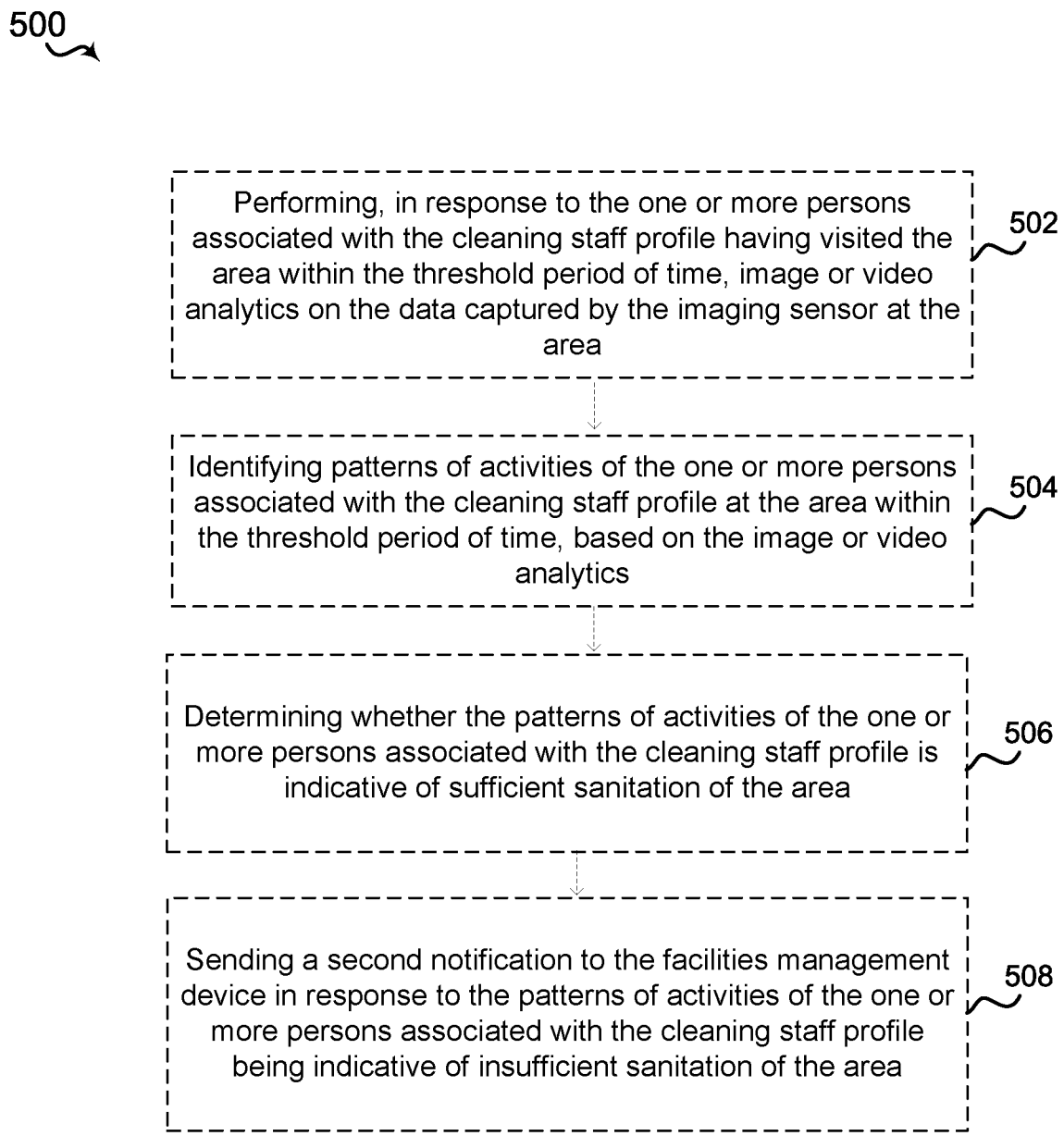
FIG. 5 is a flow diagram of a third example method for automatic sanitation verification, according to some aspects.

Referring to FIG. 5, in an optional or additional aspect, the one or more sensors comprise an imaging sensor. In this optional aspect, at block 502, the method 500 may further include performing, in response to the one or more persons associated with the cleaning staff profile having visited the area within the threshold period of time, image or video analytics on the data captured by the imaging sensor at the area. For example, in an aspect, computing device 100, processor 105, memory 110, sanitation verification component 115, and/or performing component 255 may be configured to or may comprise means for performing, in response to the one or more persons associated with the cleaning staff profile having visited the area within the threshold period of time, image or video analytics on the data captured by the imaging sensor at the area.

For example, the performing at block 502 may include, subsequent to determining that the high-touch area 126 is approached by the cleaning staff 132, the surveillance system 10 using AI/ML models to perform image/video analytics on images/videos captured by the camera 130 at the high-touch area 126.

In this optional aspect, at block 504, the method 500 may further include identifying patterns of activities of the one or more persons associated with the cleaning staff profile at the area within the threshold period of time, based on the image or video analytics. For example, in an aspect, computing device 100, processor 105, memory 110, sanitation verification component 115, and/or identifying component 260 may be configured to or may comprise means for identifying patterns of activities of the one or more persons associated with the cleaning staff profile at the area within the threshold period of time, based on the image or video analytics.

For example, the identifying at block 504 may include the surveillance system 10 providing the images/videos captured by the camera 130 as input into the AI/ML models trained and configured to determine visual patterns of activity of a person within a 3D space such as a room.

In this optional aspect, at block 506, the method 500 may further include determining whether the patterns of activities of the one or more persons associated with the cleaning staff profile is indicative of sufficient sanitation of the area. For example, in an aspect, computing device 100, processor 105, memory 110, sanitation verification component 115, and/or determining component 220 may be configured to or may comprise means for determining whether the patterns of activities of the one or more persons associated with the cleaning staff profile is indicative of sufficient sanitation of the area.

For example, the determining at block 506 may include the surveillance system 10 using the AI/ML models to detect a pattern corresponding to a shape of a body part, e.g., a hand, at the high-touch area 126, and then determining whether a movement of the body part over time corresponds to sufficient cleaning/sanitizing of the high-touch area 126.

In this optional aspect, at block 508, the method 500 may further include sending a second notification to the facilities management device in response to the patterns of activities of the one or more persons associated with the cleaning staff profile being indicative of insufficient sanitation of the area. For example, in an aspect, computing device 100, processor 105, memory 110, sanitation verification component 115, and/or sending component 230 may be configured to or may comprise means for sending a second notification to the facilities management device in response to the patterns of activities of the one or more persons associated with the cleaning staff profile being indicative of insufficient sanitation of the area.

For example, the sending at block 508 may include the surveillance system 10 retrieving (e.g., from the memory 110 or from a remote database) a threshold time period 120 that indicates the amount of time that is adequate/sufficient for cleaning the high-touch area 126. If the threshold time period 120 is not satisfied (e.g., if the cleaning staff 132 have not spent sufficient time at the location of the high-touch area 126), the surveillance system 10 may send a corresponding notification to a facilities management device 140 associated with a facilities management entity.

In an example of this aspect, for instance, the performing the image or video analytics comprises determining whether the data captured by the imaging sensor at the area indicates a visual marker associated with or attached to an object at the area. In some aspects, the object comprises a cleaning apparatus. For example, in an aspect, a cleaning rag/towel/cloth used for cleaning/sanitizing the high-touch area 126 may include a certain color/pattern/marking/shape that is detectable via imaging. In this aspect, the surveillance system 10 may use the AI/ML models to determine whether the certain color/pattern/marking/shape of the cleaning rag/towel/cloth is detectable in images/videos captured by the camera 130 as being applied to a surface at the high-touch area 126 by the cleaning staff 132.

In another example of this aspect, for instance, the performing the image or video analytics comprises determining whether the data captured by the imaging sensor at the area indicates a visual marker associated with or attached to the one or more cleaning staff. In some aspects, the visual marker is attachable to a hand of the one or more cleaning staff. In other aspects, the visual marker is attachable to a vest worn by the one or more cleaning staff. In an aspect, for example, an article worn by the cleaning staff 132, e.g., a hat, scarf, vest, bracelet, glove, etc., may include a certain color/pattern/marking/shape that is detectable by the AI/ML models via imaging. In this aspect, the surveillance system 10 may use the AI/ML models to determine a pattern of activity of the cleaning staff 132 by detecting the color/pattern/marking/shape of the article in images/videos captured by the camera 130. For example, the surveillance system 10 may use the AI/ML models to detect the color/pattern/marking/shape of the article at the high-touch area 126, and then determine whether a movement of the article corresponds to cleaning/sanitizing the high-touch area 126.

In another example of this aspect, for instance, wherein the one or more sensors comprise a proximity sensor installed at the area, the determining whether the one or more persons associated with the cleaning staff profile have visited the area within a threshold period of time comprises determining whether the proximity sensor has detected, within the threshold period of time, a badge associated with the one or more persons associated with the cleaning staff profile. In an aspect, for example, the surveillance system 10 may include one or more proximity sensors 142 positioned at or around the high-touch area 126 (e.g., an RFID sensor installed on or under a surface at the high-touch area 126). In this aspect, the surveillance system 10 may identify when the high-touch area 126 is approached by the cleaning staff 132 based on the readings of the proximity sensor 142 instead of or in addition to the readings of the access panel 128 and/or the images/videos captured by the camera 130.

Figure 6:
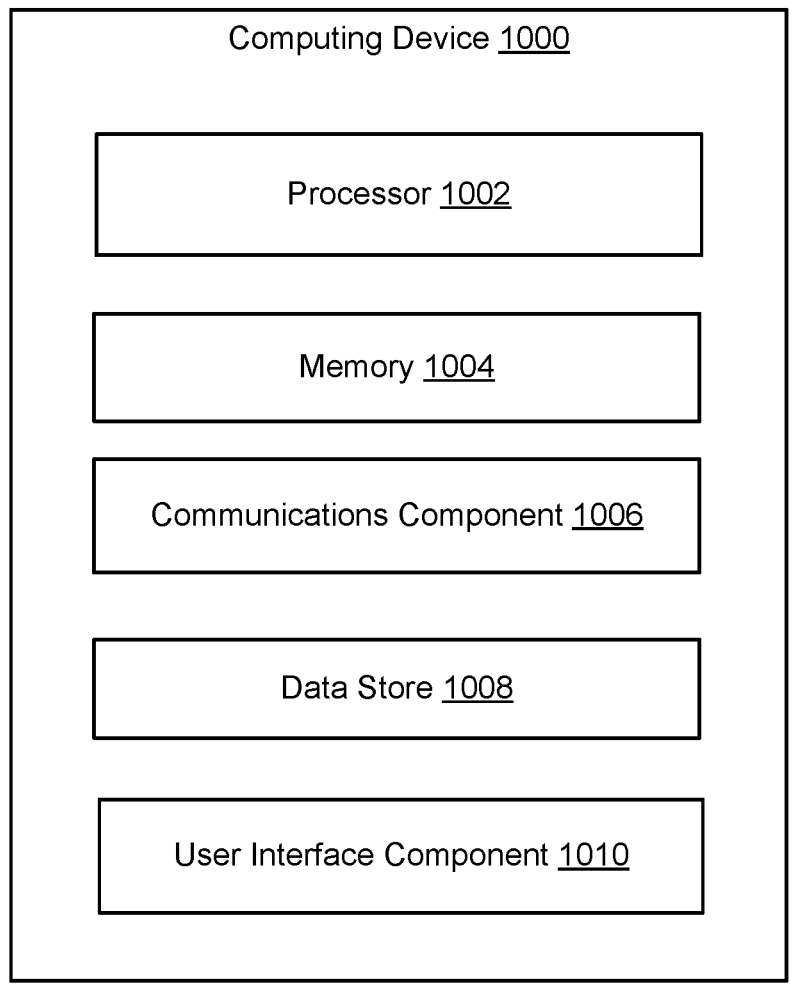
FIG. 6 is a block diagram of an example computing device which may implement all or a portion of any component in FIG. 1, according to some aspects.

Referring to FIG. 6, an example block diagram provides details of computing components in a computing device 1000 that may implement all or a portion of computing device 100, camera 130, badge 138, key fob 134, proximity sensor 142, access panel 128, facilities management device 140, or any other component described above with reference to FIGS. 1-5. The computing device 1000 includes a processor 1002 which may be configured to execute or implement software, hardware, and/or firmware modules that perform any surveillance-related or other functionality described above with reference to computing device 100, camera 130, badge 138, key fob 134, proximity sensor 142, access panel 128, facilities management device 140, or any other component described above with reference to FIGS. 1-5.

The processor 1002 may be a micro-controller and/or may include a single or multiple set of processors or multi-core processors. Moreover, the processor 1002 may be implemented as an integrated processing system and/or a distributed processing system. The computing device 1000 may further include a memory 1004, such as for storing local versions of applications being executed by the processor 1002, related instructions, parameters, etc. The memory 1004 may include a type of memory usable by a computer, such as random access memory (RAM), read only memory (ROM), tapes, magnetic discs, optical discs, volatile memory, non-volatile memory, and any combination thereof. Additionally, the processor 1002 and the memory 1004 may include and execute an operating system executing on the processor 1002, one or more applications, display drivers, etc., and/or other components of the computing device 1000.

Further, the computing device 1000 may include a communications component 1006 that provides for establishing and maintaining communications with one or more other devices, parties, entities, etc., utilizing hardware, software, and services. The communications component 1006 may carry communications between components on the computing device 1000, as well as between the computing device 1000 and external devices, such as devices located across a communications network and/or devices serially or locally connected to the computing device 1000. For example, the communications component 1006 may include one or more buses, and may further include transmit chain components and receive chain components associated with a wireless or wired transmitter and receiver, respectively, operable for interfacing with external devices.

Additionally, the computing device 1000 may include a data store 1008, which can be any suitable combination of hardware and/or software, that provides for mass storage of information, databases, and programs. For example, the data store 1008 may be or may include a data repository for applications and/or related parameters not currently being executed by processor 1002. In addition, the data store 1008 may be a data repository for an operating system, application, display driver, etc., executing on the processor 1002, and/or one or more other components of the computing device 1000.

The computing device 1000 may also include a user interface component 1010 operable to receive inputs from a user of the computing device 1000 and further operable to generate outputs for presentation to the user (e.g., via a display interface to a display device). The user interface component 1010 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 1010 may include one or more output devices, including but not limited to a display interface, a speaker, a haptic feedback mechanism, a printer, any other mechanism capable of presenting an output to a user, or any combination thereof.

Some further aspects include the below.

1. A method of surveillance data processing for sanitation verification, comprising:
    determining, by a processor based on area identification information received by a surveillance system of a premises, that an area of the premises requires periodic sanitation;
    determining, by the processor based on data captured by one or more sensors of the surveillance system, whether one or more persons associated with a cleaning staff profile have visited the area within a threshold period of time; and
    sending, by the processor, a first notification to a facilities management device in response to the one or more persons associated with the cleaning staff profile not having visited the area within the threshold period of time.

2. The method of clause 1, wherein the one or more sensors comprise an imaging sensor, wherein determining whether the one or more persons associated with the cleaning staff profile have visited the area within the threshold period of time comprises performing image or video analytics on the data captured by the imaging sensor.

3. The method of any of the above clauses, wherein the one or more sensors comprise a tag reader in an access control system, wherein determining whether the one or more persons associated with the cleaning staff profile have visited the area within the threshold period of time comprises determining whether the tag reader has read a tag associated with the one or more persons associated with the cleaning staff profile.

4. The method of any of the above clauses, further comprising:
    determining, in response to the one or more persons associated with the cleaning staff profile having visited the area within the threshold period of time, an amount of time the one or more persons associated with the cleaning staff profile have spent at the area;
    determining, whether the amount of time the one or more persons associated with the cleaning staff profile have spent at the area is higher than a threshold amount of time required for the periodic sanitation; and
    sending a second notification to the facilities management device in response to the amount of time being lower than the threshold amount of time required for the periodic sanitation.

5. The method of any of the above clauses, wherein the one or more sensors comprise an imaging sensor, wherein determining the amount of time the one or more persons associated with the cleaning staff profile have spent at the area comprises performing image or video analytics on the data captured by the imaging sensor at the area.

6. The method of any of the above clauses, wherein the one or more sensors comprise a tag reader, wherein determining the amount of time the one or more persons associated with the cleaning staff profile have spent at the area comprises determining whether the tag reader has read a tag associated with the one or more persons associated with the cleaning staff profile.

7. The method of any of the above clauses, wherein the one or more sensors comprise an imaging sensor, the method further comprising determining, based on the data captured by the imaging sensor, whether a cleaning solution has been applied to the area.

8. The method of any of the above clauses, wherein the cleaning solution comprises a marker material, wherein determining whether the cleaning solution has been applied to the area comprises determining whether the data captured by the imaging sensor detects the marker material at the area.

9. The method of any of the above clauses, the one or more sensors comprise an imaging sensor, the method further comprising:
    performing, in response to the one or more persons associated with the cleaning staff profile having visited the area within the threshold period of time, image or video analytics on the data captured by the imaging sensor at the area;

identifying patterns of activities of the one or more persons associated with the cleaning staff profile at the area within the threshold period of time, based on the image or video analytics;

determining whether the patterns of activities of the one or more persons associated with the cleaning staff profile is indicative of sufficient sanitation of the area; and sending a second notification to the facilities management device in response to the patterns of activities of the one or more persons associated with the cleaning staff profile being indicative of insufficient sanitation of the area.

10. The method of any of the above clauses, wherein performing the image or video analytics comprises determining whether the data captured by the imaging sensor at the area indicates a visual marker associated with or attached to an object at the area.

11. The method of any of the above clauses, wherein the object comprises a cleaning apparatus.

12. The method of any of the above clauses, wherein performing the image or video analytics comprises determining whether the data captured by the imaging sensor at the area indicates a visual marker associated with or attached to the one or more persons associated with the cleaning staff profile.

13. The method of any of the above clauses, wherein the visual marker is attachable to a hand of the one or more persons associated with the cleaning staff profile.

14. The method of any of the above clauses, wherein the visual marker is attachable to a vest worn by the one or more persons associated with the cleaning staff profile.

15. The method of any of the above clauses, wherein the one or more sensors comprise a proximity sensor installed at the area, wherein determining whether the one or more persons associated with the cleaning staff profile have visited the area within a threshold period of time comprises determining whether the proximity sensor has detected, within the threshold period of time, a badge associated with the one or more persons associated with the cleaning staff profile.

16. An apparatus for surveillance data processing for sanitation verification, comprising:

a memory; and a processor communicatively coupled with the memory and configured to perform the method of any of the above clauses.

17. A non-transitory computer-readable medium storing instructions for surveillance data processing for sanitation verification, the instructions being executable to perform the method of any of the above clauses.

18. An apparatus for surveillance data processing for sanitation verification, comprising means for performing the method of any of the above clauses.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of surveillance data processing for sanitation verification, comprising:

determining, by a processor, based on data captured by one or more sensors of a surveillance system, whether one or more persons associated with a cleaning staff profile have visited an area of a premises within a threshold period of time;

determining, by the processor, in response to the one or more persons having visited the area within the threshold period of time, whether a marker material of a cleaning solution is detected in one or more images of the area; and determining, by the processor, that the area has been cleaned responsive to detecting the marker material of the cleaning solution in the one or more images of the area of the premises.

2. The method of claim 1, further comprising:

determining, by the processor, based on area identification information received by the surveillance system of the premises, that the area of the premises requires periodic sanitation;

wherein determining whether one or more persons associated with the cleaning staff profile have visited the area within the threshold period of time is responsive to determining that the area of the premises requires periodic sanitation; and sending, by the processor, a first notification to a facilities management device in response to the one or more persons associated with the cleaning staff profile not having visited the area within the threshold period of time.

3. The method of claim 2, wherein determining whether the one or more persons associated with the cleaning staff profile have visited the area within the threshold period of time comprises performing image or video analytics on the data captured by an imaging sensor.

4. The method of claim 2, wherein the one or more sensors comprise a tag reader in an access control system, wherein determining whether the one or more persons associated with the cleaning staff profile have visited the area within the threshold period of time comprises determining whether the tag reader has read a tag associated with the one or more persons associated with the cleaning staff profile.

5. The method of claim 2, further comprising:
determining, in response to the one or more persons associated with the cleaning staff profile having visited the area within the threshold period of time, an amount of time the one or more persons associated with the cleaning staff profile have spent at the area;
determining, whether the amount of time the one or more persons associated with the cleaning staff profile have spent at the area is higher than a threshold amount of time required for the periodic sanitation; and
sending a second notification to the facilities management device in response to the amount of time being lower than the threshold amount of time required for the periodic sanitation.

6. The method of claim 5, wherein determining the amount of time the one or more persons associated with the cleaning staff profile have spent at the area comprises performing image or video analytics on the data captured by an imaging sensor at the area.

7. The method of claim 5, wherein the one or more sensors comprise a tag reader, wherein determining the amount of time the one or more persons associated with the cleaning staff profile have spent at the area comprises determining whether the tag reader has read a tag associated with the one or more persons associated with the cleaning staff profile.

8. The method of claim 2, wherein the one or more sensors comprise a proximity sensor installed at the area, wherein determining whether the one or more persons associated with the cleaning staff profile have visited the area within the threshold period of time comprises determining whether the proximity sensor has detected, within the threshold period of time, a badge associated with the one or more persons associated with the cleaning staff profile.

9. A method of surveillance data processing for sanitation verification, comprising:
receiving, by a processor, one or more images of an area of a premises captured by an imaging sensor of a surveillance system of the premises;
performing, by the processor, image or video analytics on the one or more images of the area to determine whether data captured by the imaging sensor at the area indicates a visual marker associated with or attached to a cleaning apparatus or personnel;
identifying, by the processor, based on the image or video analytics indicating the visual marker, patterns of activities of one or more persons detected in the one or more images of the area;
determining, by the processor, whether the patterns of activities is indicative of sufficient sanitation of the area by the one or more persons; and
sending, by the processor, a first notification to a facilities management device in response to the patterns of activities being indicative of insufficient sanitation of the area.

10. The method of claim 9, wherein the one or more persons are associated with a cleaning staff profile, the method further comprising:
determining, based on area identification information received by the surveillance system of the premises, that the area of the premises requires periodic sanitation;
determining, based on data captured by one or more sensors of the surveillance system, whether the one or more persons associated with the cleaning staff profile have visited the area within a threshold period of time;
sending a second notification to the facilities management device in response to the one or more persons associated with the cleaning staff profile not having visited the area within the threshold period of time; and
wherein determining whether the patterns of activities is indicative of sufficient sanitation of the area is in response to the one or more persons associated with the cleaning staff profile having visited the area within the threshold period of time.

11. The method of claim 10, wherein the visual marker is attachable to a hand of the one or more persons associated with the cleaning staff profile.

12. The method of claim 10, wherein the visual marker is attachable to a vest worn by the one or more persons associated with the cleaning staff profile.

13. The method of claim 10, wherein determining whether the one or more persons associated with the cleaning staff profile have visited the area within the threshold period of time is based on the image or video analytics performed on the one or more images captured by the imaging sensor.

14. The method of claim 10, wherein the one or more sensors comprise a tag reader in an access control system, wherein determining whether the one or more persons associated with the cleaning staff profile have visited the area within the threshold period of time comprises determining whether the tag reader has read a tag associated with the one or more persons associated with the cleaning staff profile.

15. The method of claim 10, further comprising:
determining, by the processor, an amount of time the one or more persons have spent at the area based on a time duration a tag or badge associated with the one or more persons is being read by a tag reader or a proximity sensor installed at the area;
determining, whether the amount of time the one or more persons associated with the cleaning staff profile have spent at the area is higher than a threshold amount of time required for the periodic sanitation; and
sending a third notification to the facilities management device in response to the amount of time being lower than the threshold amount of time required for the periodic sanitation.

16. The method of claim 15, wherein determining the amount of time is further based on the image or video analytics performed on the one or more images of the area.

17. The method of claim 15, wherein determining the amount of time the one or more persons have spent at the area further comprises determining the time duration the tag or badge is being continually read by the tag reader or the proximity sensor installed at the area.

18. The method of claim 15, wherein determining the amount of time the one or more persons have spent at the area is further based on a time elapsed between the tag or badge being successively read from different locations at the area.

\* \* \* \* \*